CONTINUOUS DUTY IGNITION SYSTEM

Filed April 24, 1968

INVENTOR.
KAUSHIK H. THAKORE
BY
Bauer and Seymour
ATTORNEYS

United States Patent Office 3,531,738

Patented Sept. 29, 1970

3,531,738

CONTINUOUS DUTY IGNITION SYSTEM

Kaushik H. Thakore, Sidney, N.Y., assignor to The Bendix Corporation, a corporation of Delaware Filed Apr. 24, 1968, Ser. No. 723,740
Int. Cl. H03k 3/30
U.S. Cl. 331—111 13 Claims

ABSTRACT OF THE DISCLOSURE

Inverter circuit adapted for use as the energizing source for loads such as an ignition circuit, and an ignition circuit powered by such inverter circuit. The inverter circuit is powered by a direct current source, and includes a transformer having inductively coupled primary, secondary, and tertiary or control windings. The inverter circuit includes a transistor, the collector-emitter terminals of which, in series with the primary winding of the transformer, are connected across the terminals of the power source, the primary winding being cyclically energized and deenergized as the transistor alternately becomes conductive and non-conductive upon variation of the base bias of the transistor. After the transfer of an energy pulse from the primary to the secondary winding during the conductive period of the transistor, the polarity of the voltage induced in the secondary and tertiary windings reverses, thereby driving the transistor into its non-conductive state. The load circuit includes a diode which open circuits the secondary winding during the periods of conduction of the transistor.

This application is related to Thakore application Ser. No. 723,727, filed Apr. 24, 1968, and assigned to the same assignee.

The invention has among its objects the provision of a novel solid state inverter circuit.

Another object of the invention is the provision of an improved inverter circuit adapted to power a continuous duty ignition circuit.

Yet another object of the invention is the provision of an ignition circuit having a substantially constant rate of spark production over a wide range of variation of the voltage of the power source for the circuit.

Other objects of the invention are the provision of an ignition circuit of the type described wherein the input current is constant over the normal input voltage range, which has a low input peak current, and which can use smaller, lighter components than those required by prior ignition circuits.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

Figure 1:
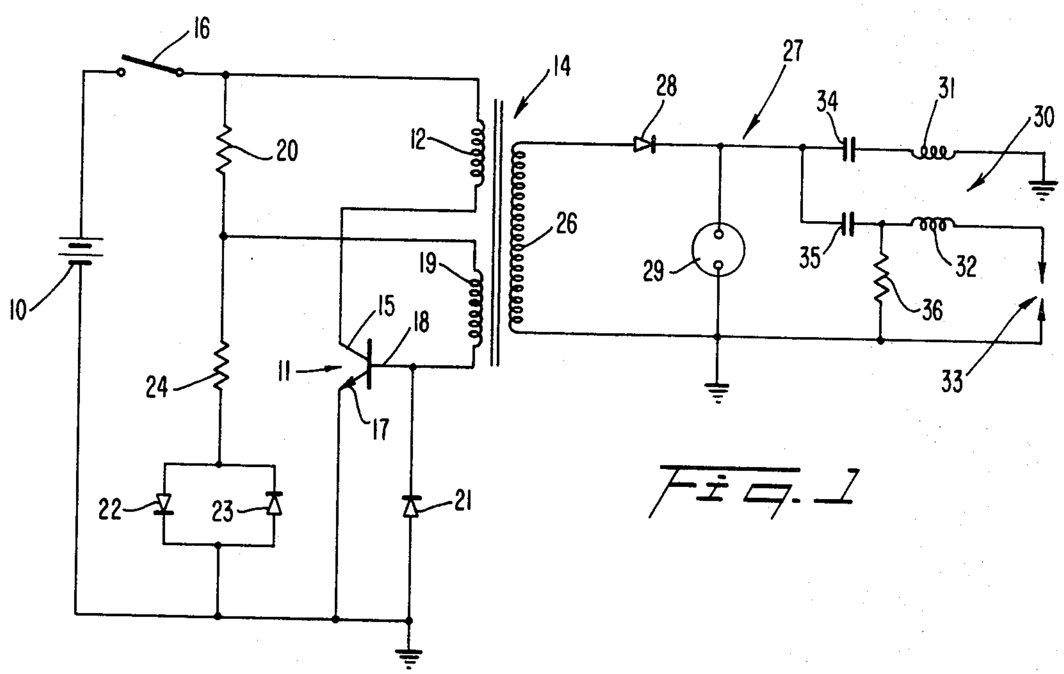
Figure 2:
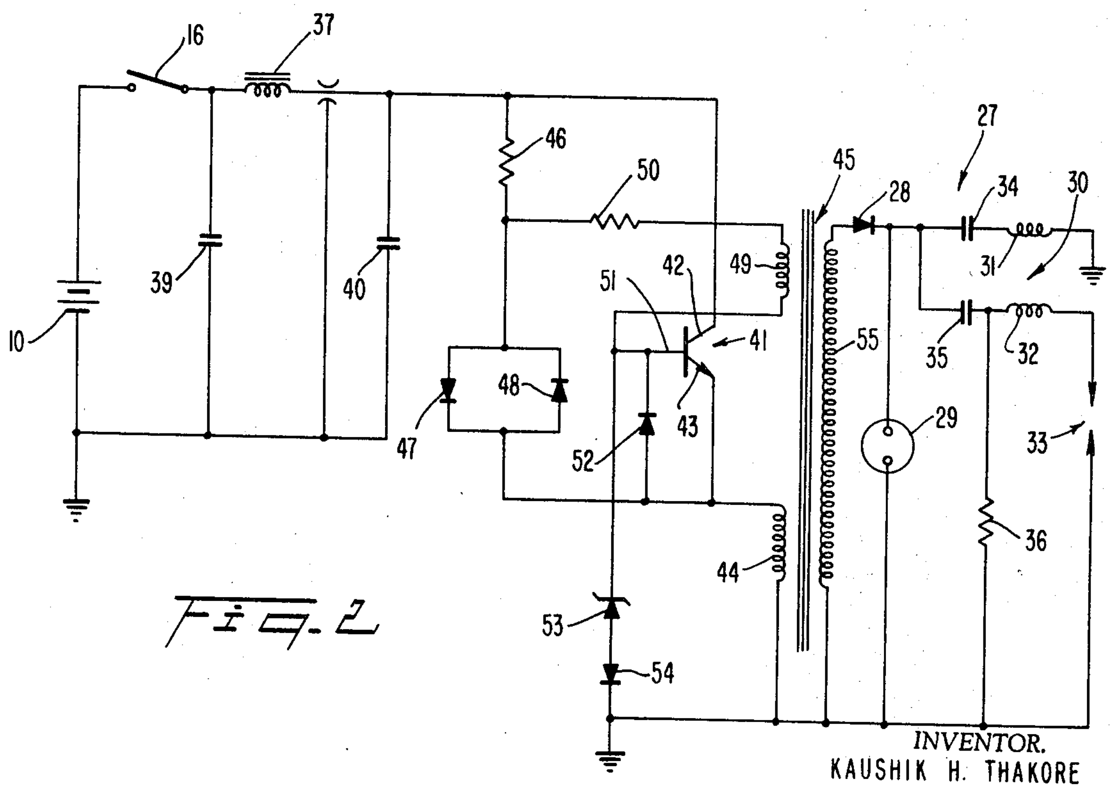

In the drawings, wherein like reference characters refer to like parts throughout the several views, FIG. 1 is a circuit diagram of a first embodiment of oscillator circuit in accordance with the invention, such oscillator being shown connected to a load in the form of an ignition circuit; and FIG. 2 is a circuit diagram of a second embodiment of oscillator circuit in accordance with the invention, such circuit being connected to a load similar to that shown in FIG. 1.

In the illustrated embodiments, novel inverter or oscillator circuits contemplated by the invention are shown as supply or energizing sources for untimed ignition circuits for jet type engines or the like. It will be apparent, however, that the pulse generating circuits of the invention may be utilized for supplying electrical power or energy to various other types of loads, including timed ignition circuits.

Turning now to the drawings, in FIG. 1 there is shown a so-called ringing choke inverter circuit powered by a battery 10 or other direct current source, the output voltage of which may vary, by way of example as in the case of commonly used batteries, between 14 and 29 volts. In FIG. 1 there is shown a common emitter mode inverter circuit which comprises an NPN type transistor 11 with a primary winding 12 of a transformer 14 connected between the collector electrode 15 of the transistor and the high voltage terminal of the battery 10 through a suitable switch 16. The transformer 14 has additionally a secondary winding 26 and a tertiary or control winding 19, the windings 12, 19, and 26 being inductively coupled and wound and disposed in the manner indicated by the dots.

The emitter terminal 17 of the transistor 11 is connected to the ground terminal of the battery 10. The base electrode 18 of the transistor is connected to the high voltage side of the battery 10 through the tertiary or control winding 19 of transformer 14 and a relatively large starting resistor 20 and to the ground reference through a diode 21 which is provided to prevent the transistor from exceeding its emitter to base voltage rating. To better assure and facilitate starting or initiation of the oscillatory action of the circuit, two oppositely polarized diodes 22 and 23 are novelly connected in parallel with each other and in series with a relatively small resistor 24 and the control or base winding 19 of the transformer 14 across the base-emitter junction of transistor 11.

The secondary winding 26 of transformer 14 is connected across a load 27 which is illustrated as an untimed ignition circuit. The ignition circuit comprises a diode rectifier 28 and a control spark gap 29 connected in series across the secondary winding 26 of the transformer 14. The ignition circuit further comprises a voltage step up transformer 30 having a primary winding 31 and a secondary winding 32. One end of each of the primary and secondary windings 31 and 32 are respectively connected to ground and to one electrode of a spark gap or spark plug 33, the other electrode of which is connected to ground and to one end of the secondary winding 26 of the transformer 14. The other ends of the primary and secondary windings of the transformer 30 are connected through a condenser 34 and a main tank condenser 35, respectively, to one terminal of control gap 29.

The circuit of FIG. 1 functions as follows: The transistor 11, which as noted is of the NPN type, is conductive when its base voltage exceeds the emitter voltage plus the *b-e* voltage drop (.7 v.), and is non-conductive when the opposite occurs. The circuit parameters, that is, the values of the resistors 20 and 24, the resistances of primary winding 12 and tertiary winding 19, and the characteristics of diodes 21, 22, and 23 are such that when the switch 16 is first closed the transistor 11 is rendered conductive. Electrical energy drawn from the battery 10 is stored in the primary winding 12 of the transformer 14 during the "on" or conduction period of the transistor. As the conduction period begins, the transistor is driven into saturation, and a constant voltage appears across the primary 12 of the transformer 14. Because of the inductance of the transformer, the constant primary voltage thereof produces a linearly rising current in the primary 12 thereof, and such current in turn induces a constant voltage in the base or tertiary winding 19 and the secondary winding 26 of the transformer 14. Since the polarity of the voltage induced in the secondary winding 26 does not allow the rectifier 28 to conduct, such secondary winding 26 is open circuited. The base voltage of the transistor 11 produces a constant base current that determines the maximum current flowing through the primary 12 of the transformer 14 and the collector 15 of the transistor 11.

Since the base current is constant during the conduction period of the transistor, the linearly rising collector current will reach a value equal to $\beta \cdot I_b$. At this time the voltage induced in the primary 12 of the transformer 14 will drop to zero, since the collector current cannot exceed $\beta \cdot I_b$. This drop in the voltage induced in the primary winding 12 starts a regeneration action which drives the transistor 11 into the cut-off region. Such regeneration action is as follows: As the current flowing through primary winding 12 drops, the polarity of the voltage induced in the secondary winding 26 of the transformer 14 is reversed, allowing the diode 28 to conduct and to supply energy to the tank capacitor 34 via ground and to capacitor 35 via resistance 36. Thus electrical energy which is fed to the primary winding 12 during the conducting period of the transistor 11 is transferred to the circuit 27 during the non-conducting period of the transistor. When the charge on the trigger condenser 34 reaches a predetermined voltage, control gap 29 breaks down, causing a flow of current through primary 31 of transformer 30. This in turn causes a high voltage current to be induced in secondary 32, such current discharging through gap 33.

As the current flowing through primary winding 12 drops, the voltage induced in the control or tertiary winding 19 is also reversed; such reversal of the voltage in winding 19 holds the transistor 11 in its non-conducting condition. Such reverse voltage condition in winding 19 remains until the energy stored in the transformer 14 is transferred to the tank capacitors 34, 35. The inverter circuit is thus restored to its initial condition, and its above described operating cycle is then repeated. The spark gap 33 discharges when the charge on capacitor 34 reaches a voltage high enough to cause such capacitor to discharge through control gap 29.

The output power of the inverter circuit depends upon the time ($T_{on}$) in the cycle during which the transistor 11 is conductive. $T_{on}$, in turn, is dependent upon the value of the base resistor 24 (constant), which determines the $I_{c\ max}$. The output voltage will vary according to the beta of the transistor 11 and the value of the base resistor 24; however, the base resistor 24 can be varied to obtain the desired output voltage from the system.

The expression for the output voltage $E_o$ is given approximately as:

$$E_o=(E_{in})\left(\frac{N_s}{N_p}\right)\left(\frac{T_{on}}{T-T_{on}}\right)$$

where $E_{in}$ is the input voltage, $N_s$ and $N_p$ are the numbers of turns of the secondary and primary windings, respectively, of transformer 14, and T is the period of the inverter cycle, that is, the reciprocal of the frequency of the inverter.

The voltage induced in the secondary is a function of the ratio of "ON" time ($T_{on}$) to "OFF" time ($T-T_{on}$), as well as a function of the turns ratio.

The rate of change of flux, $d\varphi/dt$, is greater during the "OFF" period than the "ON" period; thus a higher voltage is induced during the "OFF" period than during the "ON" period. This requires the transistor 11 to have a sufficiently high voltage rating to withstand the induced voltage in the primary plus the supply voltage during the "OFF" period.

The diodes 22 and 23, as above noted, are connected in parallel with each other and in series with the small resistor 24 and the control or base winding 19 of the transformer 14 across the base-emitter junction of transistor 11. Diode 22 better assures and facilitates starting of the oscillatory action of the circuit, while permitting the use of a starting resistor 20 of high resistance and low wattage, thus increasing the efficiency of the system and reducing the physical size of the inverter. The diode 23 completes the path of current flow in the base circuit of transistor 11.

The minimum $I_c$ and $I_b$ for the transistor 11 may be calculated from the equations $$(1)\qquad \beta=\frac{I_c}{I_f}$$

and $$(2)\qquad \frac{R_L}{n}>\gamma_e+\frac{\gamma_b}{\beta}$$

or $$(3)\qquad I_e>\frac{25}{\frac{R_L}{n}-\frac{\gamma_b}{\beta}}\times \text{milliamperes}$$

wherein $\gamma_e$ and $\gamma_b$ represent the transistor internal base and emitter resistance of the transistor, the approximate value of $\gamma_e$ is $25/I_e$ where $I_e$ is in milliamperes, $R_L$ is the secondary load reflected across the primary, and $n$ is the ratio of the turns of the primary winding 12 to the turns of the control winding 19. Equations 1 and 3 permit the minimum $I_c$ and $I_b$ of the transistor 11 to be calculated. The value of the starting resistor 20 can then be calculated from the input voltage.

In the above analysis the base to emitter voltage drop of the transistor is neglected. The diode 22 overcomes the voltage drop (VBE) of the transistor regardless of the input voltage and the value of the base resistor 24 so long as sufficient current $I_e$ (Equation 3) is furnished. The diode 22, which is a silicon diode, has a negative temperature coefficient, that is, the forward voltage drop of the diode 22 increases as the temperature of the diode decreases, thus assuring the forward bias voltage (VBE) on the transistor.

In FIG. 2 there is shown a second embodiment of inverter or oscillator circuit in accordance with the invention, the circuit of FIG. 2 differing from that of FIG. 1 mainly by the use of an NPN type transistor 41 which is connected in the common collector mode rather than in the common emitter mode employed with the transistor 11 of FIG. 1. In FIG. 2 elements which are the same as and are connected in a manner similar to those of FIG. 1 are designated by the same reference characters.

Interposed in the circuit between the switch 16 and the inverter is an RFI filter which prevents the transmission of electrical interference impulses from the spark plug 33 back to the direct current source 10. Such filter includes a choke coil 37 in the high voltage line and condensers 39 and 40 which are connected across the high voltage line on opposite sides of the choke coil to the grounded low voltage side of the current source.

The collector terminal 42 of the transistor 41 is connected to the high voltage side of the direct current source. The emitter terminal 43 of transistor 41 is connected to one end of the primary winding 44 of a transformer 45 which is similar to transformer 14 in FIG. 1, the other end of winding 44 being connected to ground. Transformer 45 has a tertiary or base control winding 49, one end of which is connected to the high voltage side of the direct current source through series connected resistors 46 and 50. The junction between such resistors is connected to the emitter 43 of the transistor 41 through parallel connected, oppositely polarized diodes 47 and 48. The second end of the control winding 49 of transformer 45 is connected to the base terminal 51 of the transistor 41 and thence to ground through serially connected oppositely polarized Zener diode 53 and diode 54. A further diode 52 is connected between the base terminal 51 of the transistor 41 and the first end of the primary winding 44 of the transformer 45.

The Zener diode 53 clamps the voltage across the primary winding 44 of the transformer 45 to the desired level, so that the peak current through the primary winding 44 will be constant despite changes in the input voltage. At the same time, the base voltage of the transistor 41 is clamped to its corresponding level. This provides a constant peak base current and hence a constant collector peak current, thereby producing a constant output power from the circuit. Because the inverter circuit in FIG. 2 is connected in the constant peak current mode, a low wattage Zener diode can be used in the base circuit.

The circuits of both FIGS. 1 and 2 display numerous advantages over prior art circuits. They can be constructed with smaller electrical components than formerly, such smaller components being correspondingly less expensive. The circuit gives increased gap life both of the control gap 29 and of the ignition gap 33. The rate of production of sparks across ignition gap 33 is nearly constant over a wide range of variation of the voltage of the current source 10. Both circuits have constant input average currents and constant input peak currents, and the diodes employed in the circuits can be of low power capacity, which means lower cost and smaller physical size. The circuit of FIG. 1 may be employed with a radio frequency filter, such as the conventional filter shown in FIG. 2. The power output from the circuits can be controlled by varying only the value of resistor 24 in FIG. 1 and resistor 50 in FIG. 2. This permits the circuit of the invention readily to be adapted to use with loads requiring different outputs.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. A pulse generating oscillator circuit adapted for energizing a load circuit, said oscillator circuit comprising a transformer having inductively coupled primary, secondary, and tertiary windings, a source of direct current, a periodically conductive and non-conductive transistor having a collector, an emitter, and a base, the collector-emitter terminals of the transistor being connected in series with the primary winding across the current source, the tertiary winding being connected between the base terminal of the transistor and a base biasing circuit comprising a starting resistor and a first diode connected in series across the current source, a base circuit including the tertiary winding, a base resistor and a second diode connected across the base-to-emitter junction of the transistor, said diodes being connected in parallel and oppositely polarized and said base resistor being much smaller than said starting resistor, and rectifying means connected to the output of the secondary winding so that said secondary winding is open circuited when the transistor is conductive and is connected to the load when the transistor is non-conductive, the parts being so constructed and arranged that the transistor is driven into saturation as the conduction period thereof starts, and a dropping of the induced voltage in the primary winding upon the attainment of a maximum by the collector current causes a regeneration action in the tertiary winding which drives the transistor into its non-conductive condition.

2. An oscillator circuit according to claim 1, wherein the first diode overcomes the voltage drop between the base and emitter of the transistor regardless of variations in the voltage of the current source, and regardless of the value of the base resistor.

3. An oscillator circuit according to claim 1, wherein the base resistor is connected in series with the starting resistor in the base biasing circuit.

4. An oscillator circuit according to claim 1, wherein the transistor is of the NPN type.

5. An oscillator according to claim 1, wherein the primary winding is connected between the emitter terminal of the transistor and the low voltage side of the current source, and further comprising a Zener diode with its cathode connected to the base terminal of the transistor and its anode connected to the low voltage side of the current source to clamp the voltage across the primary winding to the desired level, whereby the peak current through the primary winding remains constant despite changes in the voltage of the current source.

6. A pulse generating oscillator comprising a direct current source of electrical energy, a transistor having collector, emitter and base terminals, a transformer having inductively coupled primary, secondary and tertiary windings, said primary winding being connected in series with said collector and emitter terminals across said source, a transistor starting circuit comprising a first resistor connected in series with said tertiary winding and the base and emitter terminals across said source, and a base circuit comprising said tertiary winding, a second resistor and a solid state conduction control device connected in series across the base to emitter junction of the transistor and a diode connected in shunt with said conduction control device and in series with said first resistor across said source, said diode and device being oppositely polarized.

7. A pulse generating oscillator as defined in claim 6 wherein said conduction control device is a second diode.

8. A pulse generating oscillator as defined in claim 7 wherein the anode of the second diode is connected to the emitter terminal of the transistor.

9. A pulse generating oscillator as defined in claim 6 comprising a Zener diode connected between the base terminal of the transistor and the low potential terminal of said source, said primary winding being connected between the emitter terminal of the transistor and said low potential terminal of the source.

10. An inverter circuit comprising a direct current source of electrical energy, a transistor having collector, emitter and base terminals, a transformer having inductively coupled primary, secondary and tertiary windings, said primary winding being connected in series with said collector and emitter terminals across said source, a starting circuit comprising a first resistor connected in series with said tertiary winding and said base and emitter terminals across said source, and a base circuit comprising said tertiary winding connected in series with a second resistor and two oppositely-polarized, parallel-connected, uni-directional conduction control devices across the base-to-emitter junction of said transistor, said first resistor having substantially greater resistance than said second resistor.

11. An inverter circuit as defined in claim 10 wherein the one of said conduction control devices having its anode connected to the high voltage terminal of said source through said first resistor has a voltage drop at least approximately as great as the voltage drop across said base-to-emitter junction.

12. An inverter circuit as defined in claim 10 wherein said collector terminal is connected to the high voltage terminal of said source and said emitter terminal is connected to the low voltage terminal of said source through said primary winding, and further comprising means connected across said primary winding and said base-to-emitter junction to limit the voltage applied across the primary winding.

13. An inverter circuit as defined in claim 12 wherein said voltage limiting means comprises a Zener diode.

References Cited

UNITED STATES PATENTS

| | | | |
|---|---|---|---|
| 3,019,370 | 1/1962 | Basharrah | 331—112 |
| 3,070,759 | 12/1962 | Brouwer | 331—113 |
| 3,145,348 | 8/1964 | Massey | 331—111 |

FOREIGN PATENTS

| | | |
|---|---|---|
| 1,327,154 | 4/1963 | France. |

OTHER REFERENCES

L. H. Light, Wireless World, "Transistor Power Supplies," pp. 582–586, December 1955.

JOHN KOMINSKI, Primary Examiner

U.S. Cl. X.R.

315—209; 331—109, 112

UNITED STATES PATENT OFFICE

CERTIFICATE OF CORRECTION

Patent No. 3,531,738 Dated September 29, 1970

Inventor(s) Kaushik H. Thakore

It is certified that error appears in the above-identified patent and that said Letters Patent are hereby corrected as shown below:

Column 4, line 10, in equation (1) "$I_f$" should read -- $I_b$ --; line 21, equation (3), delete "X".

Signed and sealed this 7th day of September 1971.

(SEAL)
Attest:

EDWARD M.FLETCHER,JR.
Attesting Officer

ROBERT GOTTSCHALK
Acting Commissioner of Patents